(12) United States Patent
Wang et al.

(10) Patent No.: US 10,126,627 B2
(45) Date of Patent: Nov. 13, 2018

(54) COMPOSITE COLOR PARTICLES

(71) Applicant: E INK CALIFORNIA, LLC, Fremont, CA (US)

(72) Inventors: Ming Wang, Fremont, CA (US); Hui Du, Milpitas, CA (US); Xin Liu, Fremont, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 0 days.

(21) Appl. No.: 15/170,222

(22) Filed: Jun. 1, 2016

(65) Prior Publication Data

US 2016/0363832 A1    Dec. 15, 2016

Related U.S. Application Data

(60) Provisional application No. 62/174,481, filed on Jun. 11, 2015.

(51) Int. Cl.
*G02B 26/00* (2006.01)
*G02B 26/08* (2006.01)
(Continued)

(52) U.S. Cl.
CPC ............ *G02F 1/167* (2013.01); *C09C 1/3676* (2013.01); *C09C 3/10* (2013.01);
(Continued)

(58) Field of Classification Search
CPC ....... H01L 2924/00; H01L 2924/00014; H01L 2224/32225; H01L 2924/00012; H01L 2224/16225; H01L 2224/48227; H01L 2924/00013; H01L 2224/73265; H01L 2224/45144; H01L 2224/48091;
(Continued)

(56) References Cited

U.S. PATENT DOCUMENTS 5,909,314 A * 6/1999 Oka .................... G02B 1/11
                                                 359/582
6,930,818 B1    8/2005 Liang
(Continued)

FOREIGN PATENT DOCUMENTS

WO         9705200        2/1997

OTHER PUBLICATIONS

Dongri Chao, et al (1991) Poly(ethylene oxide) Macromonomers IX. Synthesis and Polymerization of Macromonomers Carrying Styryl End Groups with Enhanced Hydrophobicity. Polymer Journal 1991, vol. 23, No. 9, pp. 1045-1052.
(Continued)

*Primary Examiner* — Brandi Thomas
(74) *Attorney, Agent, or Firm* — Brian D. Bean

(57) ABSTRACT

The present invention is directed to a display fluid comprising charged composite color particles dispersed in a solvent. The composite color particle comprises core particles which are at least one color core particle and at least one core particle having a high refractive index, a shell in which the color core particles and the high refractive index core particles are completely or partially embedded, and steric stabilizer molecules on the surface of the composite color particle. A display fluid comprising the composite color particles of the present invention provides improved optical performance.

15 Claims, 4 Drawing Sheets

(51) Int. Cl.
*G02F 1/29* (2006.01)
*G02F 1/167* (2006.01)
*C09C 3/10* (2006.01)
*C09C 1/36* (2006.01)

(52) U.S. Cl.
CPC .............. *C09C 2200/1004* (2013.01); *C09C 2200/405* (2013.01); *G02F 2001/1678* (2013.01)

(58) Field of Classification Search
CPC ..... H01L 2224/73204; H01L 2924/181; H01L 2224/2929; H01L 2224/29
USPC ........ 359/237, 242, 247, 250–253, 267–273, 359/290–292, 295, 296, 298, 315, 321, 359/322
See application file for complete search history.

(56) References Cited

U.S. PATENT DOCUMENTS

| | | | |
|---|---|---|---|
| 8,018,640 | B2 | 9/2011 | Whitesides |
| 8,120,836 | B2 | 2/2012 | Lin |
| 9,285,649 | B2 | 3/2016 | Du |
| 9,366,935 | B2 | 6/2016 | Du |
| 9,372,360 | B2 | 6/2016 | Wang |
| 2008/0064788 | A1* | 3/2008 | Ben-Moshe ............. B01J 13/16 523/202 |
| 2010/0142999 | A1 | 6/2010 | Kubo |
| 2010/0266647 | A1* | 10/2010 | Dingley ................ A61K 8/042 424/401 |
| 2013/0105841 | A1* | 5/2013 | Namiki .................. H01L 33/60 257/98 |
| 2013/0175479 | A1* | 7/2013 | Du .......................... G02F 1/167 252/500 |
| 2014/0313566 | A1* | 10/2014 | Du .......................... G02F 1/167 359/296 |
| 2015/0103394 | A1 | 4/2015 | Wang |
| 2015/0185509 | A1* | 7/2015 | Wang ..................... G02F 1/167 252/500 |

OTHER PUBLICATIONS

Koichi Ito, et al (1991) Poly(ethylene oxide) Macromonomers. 7. Micellar Polymerization in Water. Macromolecules 1991, vol. 24, No. 9, pp. 2348-2354.
Seigou Kawaguchi, et al (2000) Synthesis of polyethylene macromonomers and their radical copolymerizations with methyl methacrylate in homogeneous and oligoethylene melts media. Designed Monomers and Polymers 2000, vol. 3, No. 3, pp. 263-277.
PCT/US2016/035200, PCT Notification of Transmittal of the International Search Report and the Written Opinion of The International Searching Authority, or The Declaration, dated Aug. 18, 2016.

* cited by examiner

COMPOSITE COLOR PARTICLES

This application claims priority to U.S. Application No. 62/174,481, filed Jun. 11, 2015, which is incorporated by reference herein in its entirety.

FIELD OF THE INVENTION

The present invention is directed to composite color particles that can be used in an electrophoretic fluid, and the display fluid and display device utilizing such composite color particles.

BACKGROUND OF THE INVENTION

An electrophoretic display (EPD) is a non-emissive device based on the electrophoresis phenomenon influencing charged pigment particles dispersed in a dielectric solvent. An EPD typically comprises a pair of spaced-apart plate-like electrodes. At least one of the electrode plates, typically on the viewing side, is transparent. An electrophoretic fluid composed of a dielectric solvent with charged pigment particles dispersed therein is enclosed between the two electrode plates.

For display devices capable of displaying multiple color states, charged pigment particles of different colors are dispersed in an electrophoretic fluid. However, recent studies showed that certain color pigments, on their own, have low hiding power, which resulted in unsatisfactory optical performance of a display device, such as poor color brightness and/or poor color saturation.

DETAILED DESCRIPTION OF THE INVENTION

Figure 1:
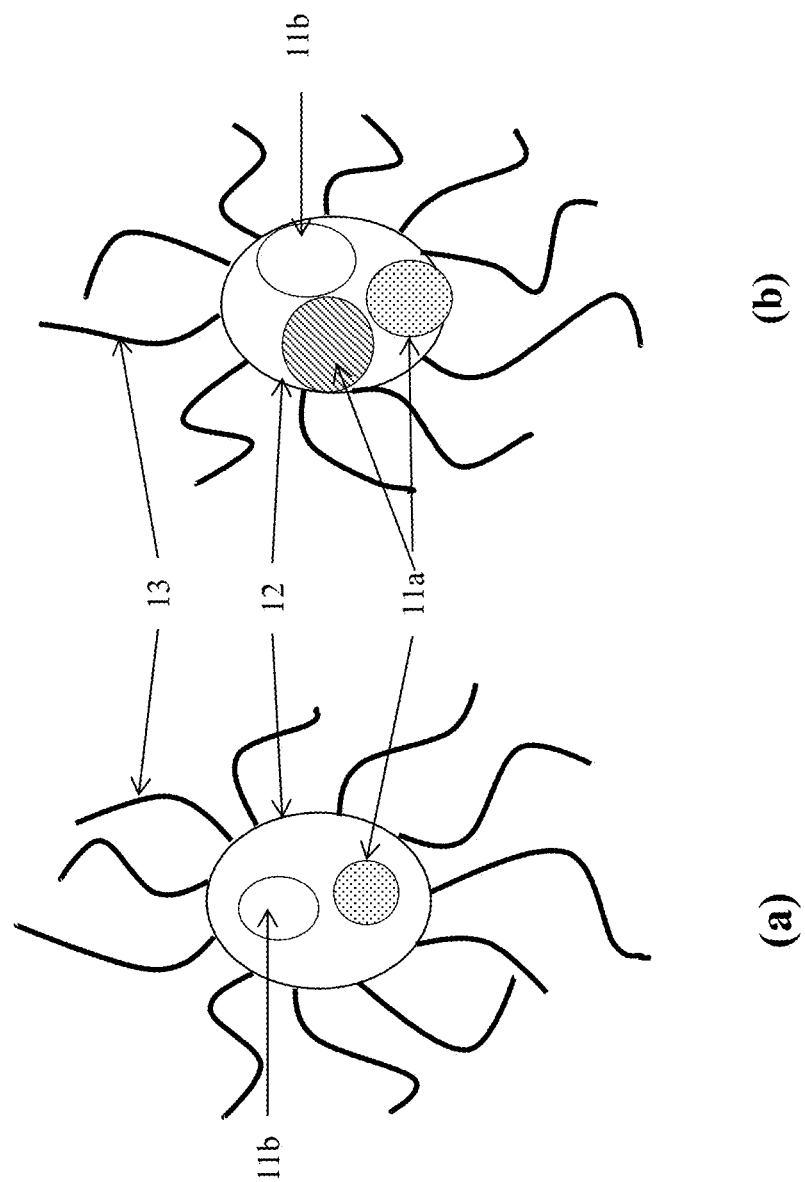
FIG. 1 shows composite color particles of the present invention.

The present invention is directed to composite color particles, as shown in FIG. 1. The composite color particle comprises at least one core particle which is a color (non-white and non-black) core particle (11a) and at least one core particle having a high refractive index (11b). The two types of core particle are held together by a shell (12). There are steric stabilizers (13) on the surface of the composite color particle.

FIG. 1 is simplified schematic drawings of the composite color particle of the present invention. In FIG. 1(a), while only one core particle which is referred to as a high refractive index core particle (11b) is shown; in practice, there may be multiple such core particles in a composite color particle, and it is also possible that the multiple high refractive index core particles are formed of different materials of high refractive indices, in the same composite color particle.

Likewise, there may be multiple color core particles (11a) and the multiple color core particles may be of different colors (see, for example, FIG. 1(b)).

The simplified drawings also show that all core particles are enclosed within the shell. In practice, some of the core particles may be on the surface of the shell, and they are held together by the shell (12). Therefore, the expression of "a shell surrounding the core particles", in the context of the present invention, encompasses a shell completely or partially surrounding the core particles.

The core particles of a high refractive index may be formed of $TiO_2$, $ZrO_2$, ZnO, $Al_2O_3$, $Sb_2O_3$, $BaSO_4$, $PbSO_4$ or the like. This type of core particles is usually white or near white. Such particles typically have a refractive index higher than 1.5, and may have a size in the range of 100 nm to 500 nm. In some embodiments, the refractive index of the core particles of a high refractive index are between 1.5 and 3.5 when measured at 589 nm. For example, the refractive index may be around 1.6, 1.7, 1.8, 2.0, 2.3, 2.5, 2.7, 3.0, or 3.3.

In a composite color particle, the weight ratio of the color core particles to the high refractive index core particles is about 1:2 to 5:1, preferably about 1:1 to 3:1.

The refractive index of the color core particle is lower than the refractive index of the high refractive index core particle. In some embodiments that refractive index of the composite color particles is greater than 1.5, e.g., greater than 1.6, e.g., greater than 1.7, e.g., greater than 1.8, e.g., greater than 2.0, e.g., greater than 2.2, e.g., greater than 2.5. For example, the refractive index of the color composite particle may be between 1.5 and 2.5 at 589 nm.

The color core particles are non-white and non-black, and they may be red, green, blue, cyan, magenta and yellow or other non-white and non-black colors.

The pigments for the color core particles may be organic or inorganic.

Organic pigments include, but are not limited to, CI pigment PR 254, PR122, PR149, PG36, PG58, PG7, PB28, PB15:3, PY83, PY138, PY150, PY155 or PY20. Those are commonly used organic pigments described in color index handbooks, "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow.

Examples of inorganic color core particles may include, but are not limited to, CI pigment blue 28, CI pigment green 50 and CI pigment yellow 227.

The core particles, especially if inorganic, may be optionally surface treated. The surface treatment would improve compatibility of the core particles to the monomer in a reaction medium, or chemical bonding with the monomer, in forming the shell of the composite color particles. As an example, the surface treatment may be carried out with an organic silane having functional groups, such as acrylate, vinyl, —$NH_2$, —NCO—, —OH or the like. These functional groups may undergo chemical reaction with the monomers.

The color core particles may also be surface treated with an inorganic material, such as silica, aluminum oxide, zinc oxide or the like or a combination thereof. Sodium silicate or tetraethoxysilane may be used as a common precursor for silica coating. In case of an inorganic treatment, the structure of the coating may be porous to reduce density.

An organic shell may be formed of an organic polymer, such as polyacrylate, polyurethane, polyurea, polyethylene, polyester, polysiloxane or the like. For example, a polymer shell may be formed from monomer, such as styrene, methyl acrylate, methyl methacrylate, n-butyl acrylate, n-butyl methacrylate, t-butyl acrylate, t-butyl methacrylate, vinyl pyridine, n-vinyl pyrrolidone, 2-hydoxyethyl acrylate, 2-hydroxyethyl methacrylate, dimethylaminoethyl methacrylate or the like. A polyurethane shell may be formed from monomer or oligomer, such as multifunctional isocyanate or thioisocyanate, primary alcohol or the like. A polyurea shell may be formed from monomer containing reactive groups, such as amine/isocyanate, amine/thioisocyanate or the like. A person skilled in the art would be able to select proper monomer or oligomer and its variations, based on the concept of the present invention.

The shell thickness may be controlled, based on the density of the shell material and the desired final particle density.

The shell material is either completely incompatible or relatively incompatible with the display fluid in which the composite color particles are dispersed. The term "relatively incompatible" as used herein, means that no more than 5%, preferably no more than 1%, of the shell material is miscible with the display fluid.

In order to achieve this complete or relative incompatibility, a polymeric shell material may have polar functionality on its main chain or a side chain. Examples of such polar functionality may include —COOH, —OH, —NH$_2$, —O—R, —NH—R and the like (wherein R is an alkyl or aryl group). Each of the side chains, in this case, preferably has less than 6 carbon atoms. In one embodiment, the main chain or side chain may contain an aromatic moiety.

In addition, the core particles and the shell should behave as one single unit. This may be achieved by cross-linking or an encapsulation technique, as described below.

In addition to the steric stabilizer, the surface of the shell may optionally have functional groups that would enable charge generation or interaction with a charge control agent.

The steric stabilizer (13) in FIG. 1 is usually formed of high molecular weight polymers (whose weight average molecular weight is higher than 1000), such as polyethylene, polypropylene, polyester, polysiloxane or a mixture thereof. The steric stabilizers should be compatible with the solvent in which the composite color particles are dispersed to facilitate dispersion of the composite color particles in the solvent.

Methods of Preparation:

The composite color particles of the present invention may be formed by dispersion polymerization. During dispersion polymerization, monomer is polymerized around core particles in the presence of a steric stabilizer polymer soluble in the reaction medium. The solvent selected as the reaction medium must be a good solvent for both the monomer and the steric stabilizer polymer, but a non-solvent for the polymer shell being formed. For example, in an aliphatic hydrocarbon solvent of Isopar G®, monomer methylmethacrylate is soluble; but after polymerization, the resulting polymethylmethacrylate is not soluble.

As stated above, the polymer shell formed from the monomer must be completely incompatible or relatively incompatible with the solvent in which the composite color particles are dispersed. Monomers suitable for forming the shell may be those described above (such as styrene, methyl acrylate, methyl methacrylate, n-butyl acrylate, n-butyl methacrylate, t-butyl acrylate, t-butyl methacrylate, vinyl pyridine, n-vinyl pyrrolidone, 2-hydoxyethyl acrylate, 2-hydroxyethyl methacrylate, dimethylaminoethyl methacrylate or the like).

The steric stabilizer polymer may be a reactive and polymerizable macromonomer which adsorbs, becomes incorporated, or is chemically bonded, onto the surface of the polymer shell being formed.

Macromonomers are relatively high molecular weight species with a single functional polymerizable group which, although used as monomers, have high enough molecular weight or internal monomer units to be considered polymers. A macromonomer has one end-group which enables it to act as a monomer molecule, contributing only a single monomeric unit to a chain of the final macromolecule. The macromonomer as a steric stabilizer, determines the particle size and colloidal stability of the system.

The macromonomer may be an acrylate-terminated or vinyl-terminated macromolecule, which are suitable because the acrylate or vinyl group can co-polymerize with the monomer in the reaction medium.

The macromonomer preferably has a long tail, R, which may stabilize the composite color particles in a hydrocarbon solvent.

One type of macromonomers is acrylate terminated polysiloxane (Gelest, MCR-M11, MCR-M17, MCR-M22), as shown below:

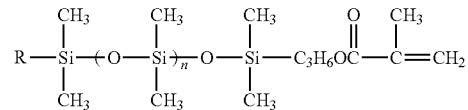

Another type of macromonomers which is suitable for the process is PE-PEO macromonomers, as shown below:

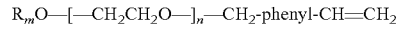

or

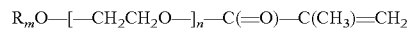

The substituent R may be a polyethylene chain, n is 1-60 and m is 1-500. The synthesis of these compounds may be found in Dongri Chao et al., Polymer Journal, Vol. 23, no. 9, 1045 (1991) and Koichi Ito et al, Macromolecules, 1991, 24, 2348.

A further type of suitable macromonomers is PE macromonomers, as shown below:

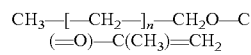

The n, in this case, is 30-100. The synthesis of this type of macromonomers may be found in Seigou Kawaguchi et al, Designed Monomers and Polymers, 2000, 3, 263.

Figure 2:
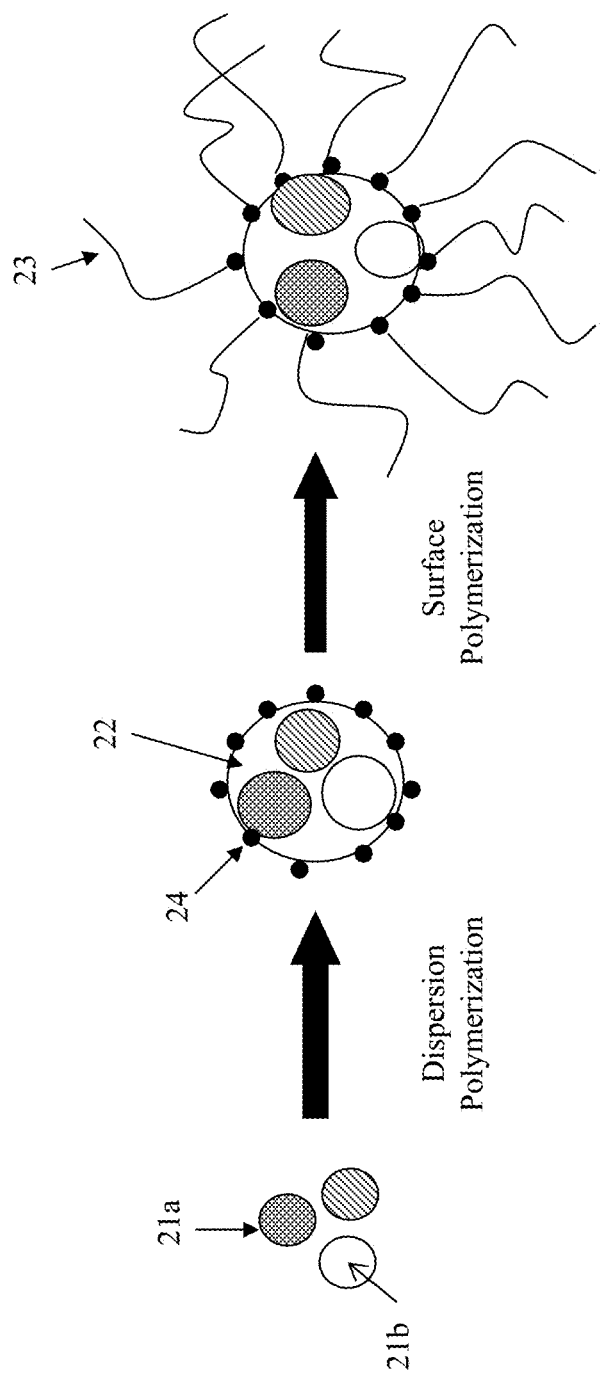
FIG. 2 shows reaction steps of a process suitable for the preparation of the composite color particles of the present invention.

Alternatively, the composite color particles may be prepared by living radical dispersion polymerization, as shown in FIG. 2.

The living radical dispersion polymerization technique is similar to the dispersion polymerization described above by starting the process with core color particles (21a) and high refractive index particles (21b), and monomer dispersed in a reaction medium.

The monomers used in the process to form the shell (22) may include styrene, methyl acrylate, methyl methacrylate, n-butyl acrylate, n-butyl methacrylate, t-butyl acrylate, t-butyl methacrylate, vinyl pyridine, n-vinyl pyrrolidone, 2-hydoxyethyl acrylate, 2-hydroxyethyl methacrylate, dimethylaminoethyl methacrylate and the like.

However in this alternative process, multiple living ends (24) are formed on the surface of the shell (22). The living ends may be created by adding an agent such as TEMPO (2,2,6,6-tetramethyl-1-piperidinyloxy), a RAFT (reversible addition-fragmentation chain transfer) reagent or the like, in the reaction medium.

In a further step, a second monomer is added to the reaction medium to cause the living ends (24) to react with the second monomer to form the steric stabilizers (23). The second monomer may be lauryl acrylate, lauryl methacrylate, 2-ethylhexyl acrylate, 2-ethylhexyl methacrylate, hexyl acrylate, hexyl methacrylate, n-octyl acrylate, n-octyl methacrylate, n-octadecyl acrylate, n-octadecyl methacrylate or the like.

Further alternatively, the composite color particles may be formed by coating core particles by non-aqueous emulsion poly-condensation.

In this alternative process, the shell of the composite color particles may be a polyurethane or polyurea material. The steric stabilizers may be non-polar long chain hydrocarbon molecules. Polyurethane and polyurea usually are not compatible with a non-polar hydrocarbon solvent and the hardness and elastic property of the polyurethane or polyurea may be tuned through the monomer composition.

This synthesis method is similar to emulsion or dispersion polymerization, except that polycondensation occurs, inside micelles, with polyurethane or polyurea monomer and the core particles.

The polyurethane or polyurea coating system may be considered as an oil-in-oil emulsion, which contains two incompatible solvents, one of which is a non-polar organic solvent and the other is a polar organic solvent. The system may also be referred to as non-aqueous emulsion polycondensation, in which the non-polar solvent is the continuous phase and the polar solvent is the non-continuous phase. The monomer and the core particles are in the non-continuous phase. Suitable non-polar solvents may include the solvents in the Isopar® series, cyclohexane, tetradecane, hexane and the like. The polar solvents may include acetonitrile, DMF and the like.

An emulsifier or dispersant is critical for this biphasic organic system. The molecular structure of the emulsifier or dispersant may contain one part soluble in the non-polar solvent, and another part anchoring to the polar phase. This will stabilize the micelles/droplets containing the monomer and the core particles and serving as a micro-reactor for particle formation through polycondensation.

Suitable emulsifiers or dispersants may include di-block co-polymers, such as poly (isoprene)-b-poly(methyl methacrylate), polystyrene-b-poly(ethene-alt-propene) (Kraton) or the like.

Also, a co-emulsifier may be added to form chemical bonding with the core particles. For example, amine terminated hydrocarbon molecules can react with the core particles during polycondensation and bond to surface as robust steric stabilizers. Suitable co-emulsifiers may include surfonamine (B-60, B-100 or B-200) as shown below:

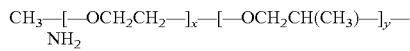

wherein x is 5-40 and y is 1-40.

In one approach, the process may continue growing polyacrylate steric stabilizers after the polycondensation reaction in the microreactor is completed. In this case, the shell is formed from polyurethane while the steric stabilizers may be polyacrylate chains. After the emulsifier or dispersant used in the process is washed away from the particle surface, the composite color particles are stable in the non-polar solvent (i.e., display fluid) with the polyacrylate stabilizers. Some materials that can initiate acrylate polymerization include isocyanatoethyl acrylate, isocyanatostyrene or the like.

Monomers for the steric stabilizer may be a mixture of hydroxyethyl methacrylate and other acrylate that are compatible to the non-polar solvent, such as lauryl acrylate, lauryl methacrylate, 2-ethylhexyl acrylate, 2-ethylhexyl methacrylate, hexyl acrylate, hexyl methacrylate, n-octyl acrylate, n-octyl methacrylate, n-octadecyl acrylate, n-octadecyl methacrylate or the like.

In any of the processes described above, to incorporate functional groups for charge generation, a co-monomer may be added in the reaction medium. The co-monomer may either directly charge the composite color particles or have interaction with a charge control agent in the display fluid to bring a desired charge polarity and charge density to the composite color particles. Suitable co-monomers may include vinylbenzyl-aminoethylamino-propyl-trimethoxysilane, methacryloxypropyltrimethoxysilane, acrylic acid, methacrylic acid, vinyl phosphoric acid, 2-acrylamino-2-methylpropane sulfonic acid, 2-(dimethylamino)ethyl methacrylate, N-[3-(dimethylamino)propyl]methacrylamide and the like.

The quantities of the reagents used (e.g., the core particles, the shell materials and the material for forming the steric stabilizers) in any of the processes described above may be adjusted and controlled to achieve the desired composition of the resulting composite color particles.

The "polymer content" of the composite color particles may be at least 20% by weight, preferably 25% to 70% by weight and more preferably 25% to 50% by weight. The term "polymer content" is determined by the total weight of the shell (12) and the steric stabilizers (13) divided by the total weight of the core particles (11a and 11b), the shell (12) and the steric stabilizers (13).

A further aspect of the present invention is directed to a display fluid comprising the composite color particles of the present invention, which composite color particles are dispersed in a solvent or solvent mixture.

A preferred solvent has a low dielectric constant (preferably about 2 to 3), a high volume resistivity (preferably about 1015 ohm-cm or higher) and a low water solubility (preferably less than 10 parts per million). Suitable hydrocarbon solvents may include, but are not limited to, dodecane, tetradecane, the aliphatic hydrocarbons in the Isopar® series (Exxon, Houston, Tex.) and the like. The solvent can also be a mixture of a hydrocarbon and a halogenated carbon or silicone oil-base material.

Yet a further aspect of the present invention is directed to a display device utilizing an electrophoretic fluid comprising the composite color particles of the present invention dispersed in a solvent or solvent mixture. The fluid is sandwiched between two electrode plates.

Figure 3:
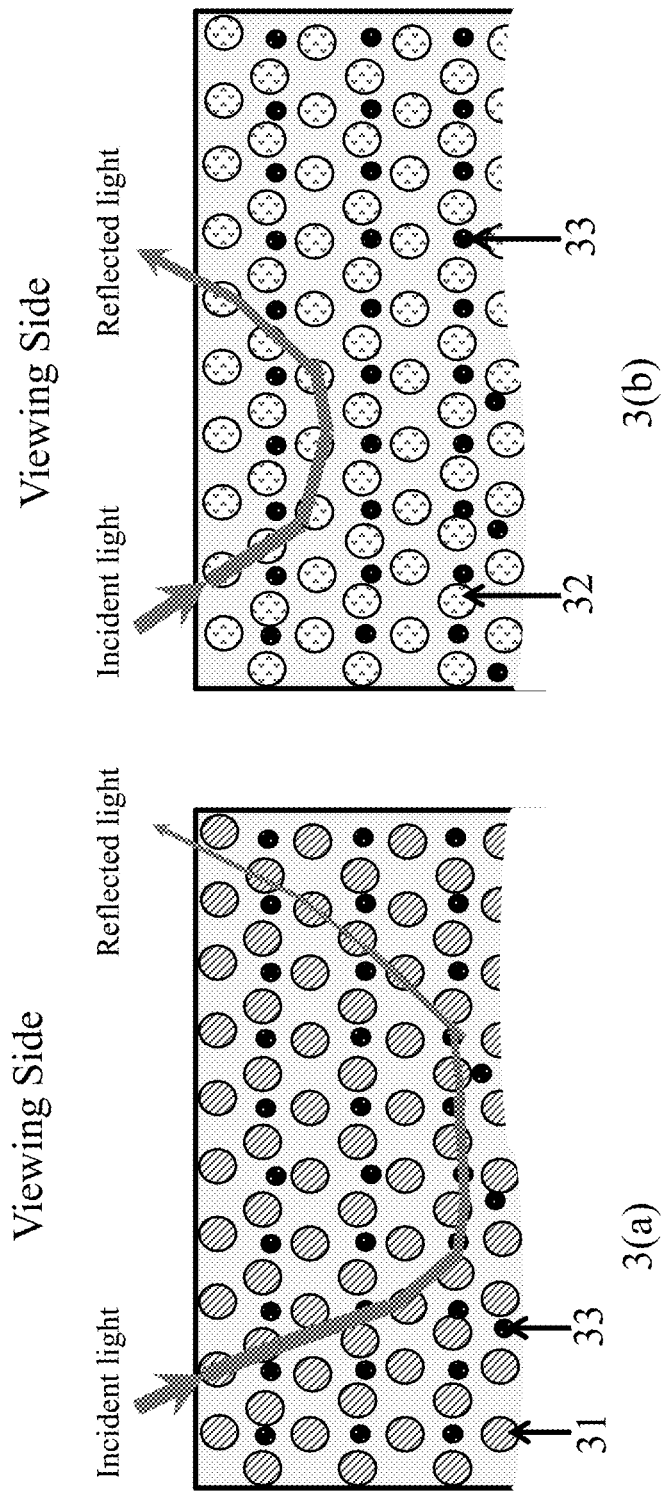
FIG. 3 shows comparison of light paths in electrophoretic fluids containing control color particles against composite color particles of the present invention.

Advantages of the Composite Particles of the Present Invention:

FIG. 3 are cross-sectional views of two electrophoretic fluids. In FIG. 3(a), an electrophoretic fluid is shown to have regular color particles (i.e., control, 31) dispersed therein and there are also undesired black particles (33) in the fluid. In FIG. 3(b), an electrophoretic fluid is shown to have the composite color particles (32) of the present invention and also the undesired black particles (33) dispersed therein.

It is believed that due to the overall higher refractive index of the composite color particles of the present invention, the incoming light does not penetrate into the fluid in FIG. 3(b) as deeply as the incoming light into the fluid in FIG. 3(a). As a result, the incoming light travels a shorter path in the fluid of FIG. 3(b) and therefore less light is absorbed by the undesirable randomly dispersed black particles (33), which leads to brighter and more saturated colors displayed by the fluid of FIG. 3(b), viewed from the viewing side.

EXAMPLE

Synthesis of Composite Color Particles
A. Preparation of Control Sample:

Red pigment, Hostaperm Red D3G 70-EDS (Clariant, 16 g), methyl methacrylate (20 g) MCR-M22 (Gelest, 30 g) and DMS-T01 (Gelest, 135 g) were added to a 750 ml reactor and sonicated for 2 hours. The reactor was heated to 70° C. with magnetic stirring and purged with nitrogen for 20 minutes, followed by the addition of lauroyl peroxide dissolved in 2 g ethyl acetate (0.07 g). After 19 hours, the mixture was centrifuged at 5000 rpm for 15 minutes. The solids produced were redispersed in hexane and centrifuged. This cycle was repeated twice and the solids were dried at room temperature under vacuum to produce the final particles.

Tested through TGA (thermal gravimetric analysis), the weight of the polymer content was calculated based on the weight loss at a temperature of 150 to 400° C. Based on the results, it was then determined that the polymer content of the particles produced was about 40% by weight. Therefore each particle prepared from Step A had about 60% by weight of the red pigment.

B. Preparation of Sample of the Present Invention:

Red pigment, Hostaperm Red D3G 70-EDS (Clariant, 16 g), polymer coated titanium dioxide particles (8 g), methyl methacrylate (20 g) MCR-M22 (Gelest, 30 g) and DMS-T01 (Gelest, 135 g) were added to a 750 ml reactor and sonicated for 2 hours. The reactor was heated to 70° C. with magnetic stirring and purged with nitrogen for 20 minutes, followed by the addition of lauroyl peroxide dissolved in 2 g ethyl acetate (0.07 g). After 19 hours, the mixture was centrifuged at 5000 rpm for 15 minutes. The solids produced were redispersed in hexane and centrifuged. This cycle was repeated twice and the solids were dried at room temperature under vacuum to produce the final particles.

Tested through TGA (thermal gravimetric analysis), the weight of the polymer content was calculated based on the weight loss at 150 to 400° C.; the weight of the red pigment was calculated based on the weight loss at 400 to 500° C.; and the remaining weight was the weight of $TiO_2$. Based on the results, it was determined that the polymer content of the particles produced was about 28% by weight and the ratio of the red pigment to $TiO_2$ was about 2.8:1. Accordingly, each particle prepared in Step B had about 53% by weight of the red pigment.

Testing Results:

Two dispersion samples (invention vs. control) were prepared by dispersing the same amount of particles prepared from Steps A and B respectively, in an Isopar™ G fluid. The same types and amounts of polymer coated black and white particles and surfactants were also added to each sample. The polymer coated black and white particles were prepared as described in US Patent Publication No. 20130175479. The dispersions were then used to prepare electrophoretic displays based on the Microcup® technology described in U.S. Pat. No. 6,930,818.

Figure 5:
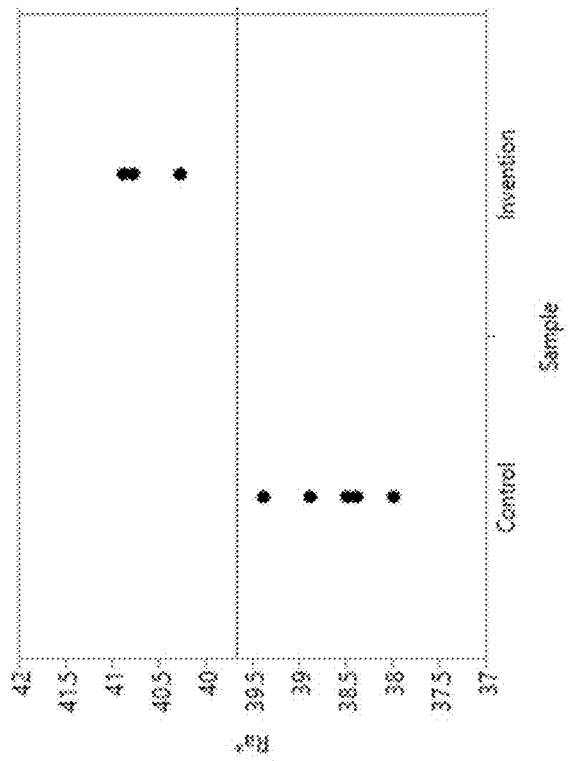
FIGS. 4 and 5 show test results of the example.
Figure 4:
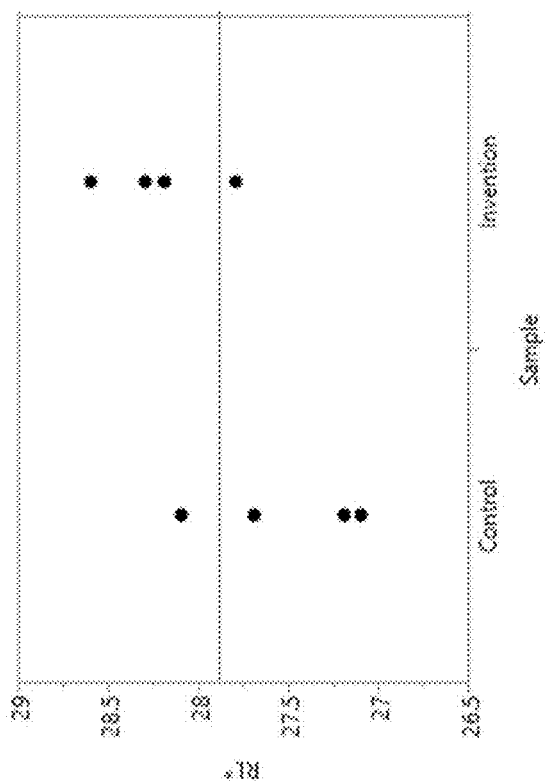

FIGS. 4 and 5 show the comparison results. As shown, in spite of the lower red pigment loading, the invention sample containing the red composite particles prepared from Step B showed higher red color brightness (RL*) and also higher red color saturation (Ra*), compared to the control sample.

While the present invention has been described with reference to the specific embodiments thereof, it should be understood by those skilled in the art that various changes may be made and equivalents may be substituted without departing from the scope of the invention.

What is claimed is:

1. A composite color particle comprising:
   a) at least one color core particle which is non-white and non-black;
   b) at least one white core particle comprising $TiO_2$;
   c) a shell in which the color core particle and the white core particle are completely or partially embedded, wherein the weight ratio of the color core particles to the white core particles is about 1:2 to 5:1; and
   d) steric stabilizers on the surface of the composite color particle.

2. The composite color particle of claim 1, wherein the refractive index of the color core particle is lower than that of the white core particle.

3. The composite color particle of claim 1, wherein the color core particle is red, green, blue, yellow, magenta or cyan.

4. The composite color particle of claim 1, wherein the color core particle comprises an organic pigment.

5. The composite color particle of claim 1, wherein the color core particle comprises an inorganic pigment.

6. The composite color particle of claim 1, wherein the white core particle has a size in the range of 10 nm to 500 nm.

7. The composite color particle of claim 1, wherein there is more than one type of color core particle and the different types of color core particles are of different colors.

8. The composite color particle of claim 1, wherein the weight ratio of the color core particles to the white core particles is about 1:1 to 3:1.

9. The composite color particle of claim 1, wherein the shell is formed of polyacrylate, polyurethane, polyurea, polyethylene, polyester or polysiloxane.

10. The composite color particle of claim 1, wherein the shell is formed from styrene, methyl acrylate, methyl methacrylate, n-butyl acrylate, n-butyl methacrylate, t-butyl acrylate, t-butyl methacrylate, vinyl pyridine, n-vinyl pyrrolidone, 2-hydoxyethyl acrylate, 2-hydroxyethyl methacrylate or dimethylaminoethyl methacrylate.

11. The composite color particle of claim 1, wherein the steric stabilizer is formed of high molecular weight polymers.

12. The composite color particle of claim 1, wherein the steric stabilizer is formed of polyethylene, polypropylene, polyester, polysiloxane or a mixture thereof.

13. The composite color particle of claim 1, wherein the refractive index of the composite color particle is between 1.5 and 2.5 at 589 nm.

14. An electrophoretic fluid comprising the composite color particles of claim 1 dispersed in a solvent or solvent mixture.

15. An electrophoretic display device comprising an electrophoretic fluid of claim 14 sandwiched between two electrode layers.

* * * * *